United States Patent [19]

Bailey et al.

[11] Patent Number: 4,986,310

[45] Date of Patent: Jan. 22, 1991

[54] LOW PRESSURE CHECK VALVE

[75] Inventors: James C. Bailey, Yellow Springs; Gordon E. Atkinson, Cedarville; Dennis A. Boehmer, Xenia, all of Ohio

[73] Assignee: Vernay Laboratories, Inc., Yellow Springs, Ohio

[21] Appl. No.: 468,424

[22] Filed: Jan. 22, 1990

[51] Int. Cl.$^5$ .............................................. F16K 15/14
[52] U.S. Cl. ..................................................... 137/859
[58] Field of Search ................................ 137/852, 859

[56] References Cited

U.S. PATENT DOCUMENTS

| | | | |
|---|---|---|---|
| 2,758,609 | 8/1956 | Dickert | 137/859 |
| 3,085,591 | 4/1963 | Schneider | 137/859 |
| 4,188,978 | 2/1980 | De Lorenzo | 137/859 |
| 4,712,583 | 12/1987 | Pelmulder et al. | 137/852 |
| 4,776,839 | 10/1988 | Doumenis | 137/859 X |

*Primary Examiner*—Robert G. Nilson
*Attorney, Agent, or Firm*—Biebel, French & Nauman

[57] ABSTRACT

A valve assembly is disclosed for allowing fluid flow in a first direction and preventing fluid flow in a second direction. The valve assembly includes a housing for enclosing a substantially circular regulator assembly which extends diametrically across the housing. The regulator assembly comprises a hub portion which is positioned centrally within the housing and connecting members which extend radially toward a rim portion which is supported by the housing. The hub portion supports a disk-shaped substantially inflexible portion of the regulator assembly which extends over the connecting members to engage the rim portion and thereby prevent fluid flow in the second direction. The connecting members of the regulator assembly are adapted to flex and allow the disk portion to move off of the rim and thereby allow fluid flow through the valve in the first direction.

26 Claims, 3 Drawing Sheets

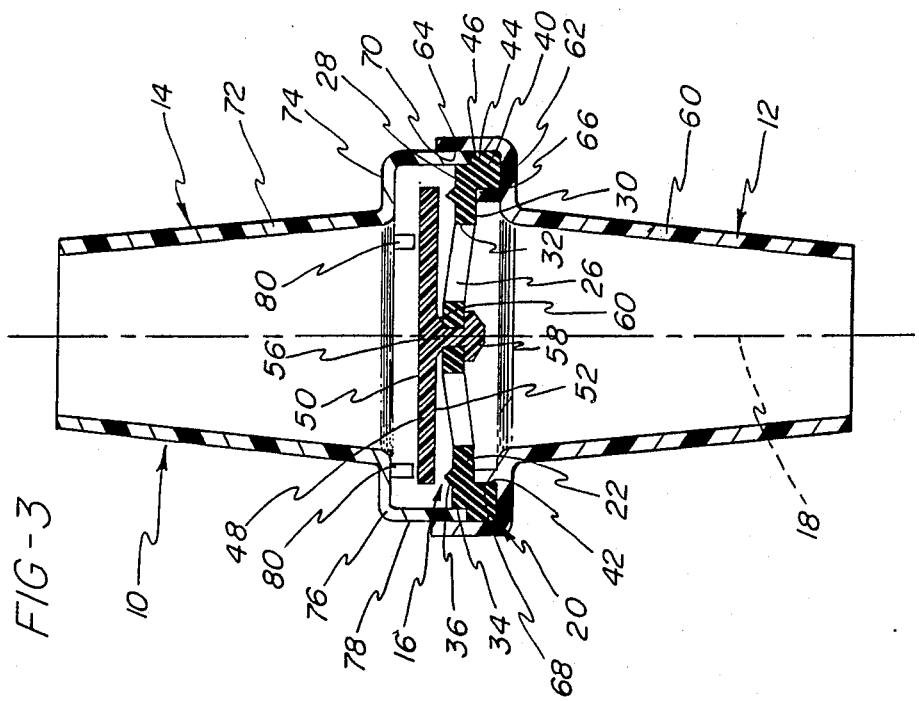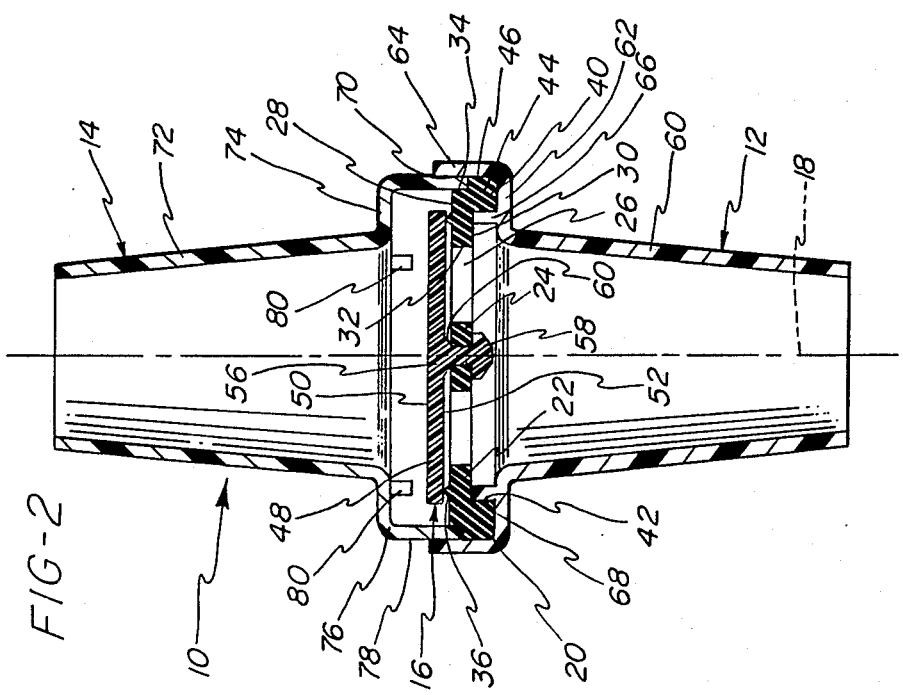

LOW PRESSURE CHECK VALVE

BACKGROUND OF THE INVENTION

The present invention relates generally to a flow regulation apparatus, and more particularly, to a one-way check valve which will open at very low pressures to allow high flow rates in a first direction and which will close to prevent flow in a second direction.

One requirement of one-way flow valves, such as the type used as check valves in positive crankcase ventilation systems for internal combustion engines, is that the valves must offer little resistance to fluid flow in one direction but will completely stop fluid flow in the opposite direction. A valve which is commonly used for this purpose is a poppet valve which comprises an axially movable valve member which is typically biased toward a valve seat by a helical spring. This type of valve suffers from the problem of requiring numerous structural elements to maintain the alignment of the movable valve member and to provide the biasing force to close the valve. In addition, the weight of the movable valve member results in this member having too much inertia to respond quickly to sudden changes in direction of the fluid flow at low pressures.

Another valve which is known in the art for limiting flow in one direction and providing a high flow rate is the umbrella valve. In the umbrella valve, the movable valve member is formed of a flexible material and has a generally curved cross section. Hoop stresses in the radially outer portions of the valve member produce the spring force biasing the valve closed which must be overcome to open the valve. Thus, umbrella valves are designed to initially open at a small predetermined pressure and subsequently open further to provide a large flow rate with an increase in pressure.

While known check valves are satisfactory for many applications, the ability of known valves to respond at low pressures typically decreases as the size of the valve and the volume of fluid flow conducted by the valve is increased. Thus, there exists a need for a valve which is capable of permitting high fluid flow rates at very low pressures. In addition, there exists a need for a valve which will open and close quickly in response to changes in direction of the fluid flow and which will not collapse when subjected to high pressures in a reverse flow condition.

SUMMARY OF THE INVENTION

The present invention is a valve assembly for allowing high fluid flow rates at a low pressure in a first direction and for preventing fluid flow at high pressures in a second opposite direction.

The valve assembly comprises a housing which may have a tubular shape having inlet and outlet portions. The inlet and outlet portions are adapted to telescopingly fit within each other for enclosing a flow regulator assembly within the housing.

The flow regulator assembly includes a flexible elastic element having a rim portion, a hub portion, and connecting members extending from the hub portion to the rim portion such that the rim, hub and connecting members define apertures through the elastic element.

The rim of the elastic element includes a raised bead portion on one surface thereof on the outlet side of the valve assembly. The outer edge of the rim is rigidly supported by the housing. A thin disk made of an inelastic relatively inflexible material such as plastic is supported by the hub portion of the elastic element and has a diameter which is slightly greater than the diameter defined by the raised bead portion on the rim of the elastic element. In addition, the housing includes a raised lip portion located on the inlet side of the elastic element such that when a pressure is applied from the outlet portion toward the inlet portion of the housing, the disk, which normally rests upon the bead portion at the outer side of the elastic element, will be forced firmly onto the bead portion and the raised lip will support the elastic element and prevent it from moving.

When a fluid flow occurs from the inlet to the outlet side of the housing, the disk is lifted away from the bead portion of the elastic element, thereby flexing the connecting members such that the fluid flows through the apertures in the elastic element and around the edges of the disk to pass out through the outlet portion of the housing.

In an alternative embodiment, the raised bead portion may be located on the disk for engaging an opposing surface on the rim of the elastic element and thereby forming a seal for preventing fluid flow as described above.

Thus, the valve of the present invention provides a light movable disk element which presents a large surface area to pressure differentials occurring on opposite sides of the valve, such that small pressure differentials within the valve result in quick opening and closing movements of the disk.

In addition, the connecting members supporting the disk provide a flexible support means for the disk while presenting a minimum restriction to the flow through the elastic element such that large fluid flows may be obtained when the valve is open.

Other objects and advantages of the invention will be apparent from the following description, the accompanying drawings and the appended claims.

DESCRIPTION OF THE DRAWINGS

FIG. 2 is an elevational view of a cross section along line 2—2 in FIG. 1;

FIG. 3 is an elevational view similar to FIG. 2 in which the valve is shown open for moderate flow.

DESCRIPTION OF THE PREFERRED EMBODIMENT

Figure 1:
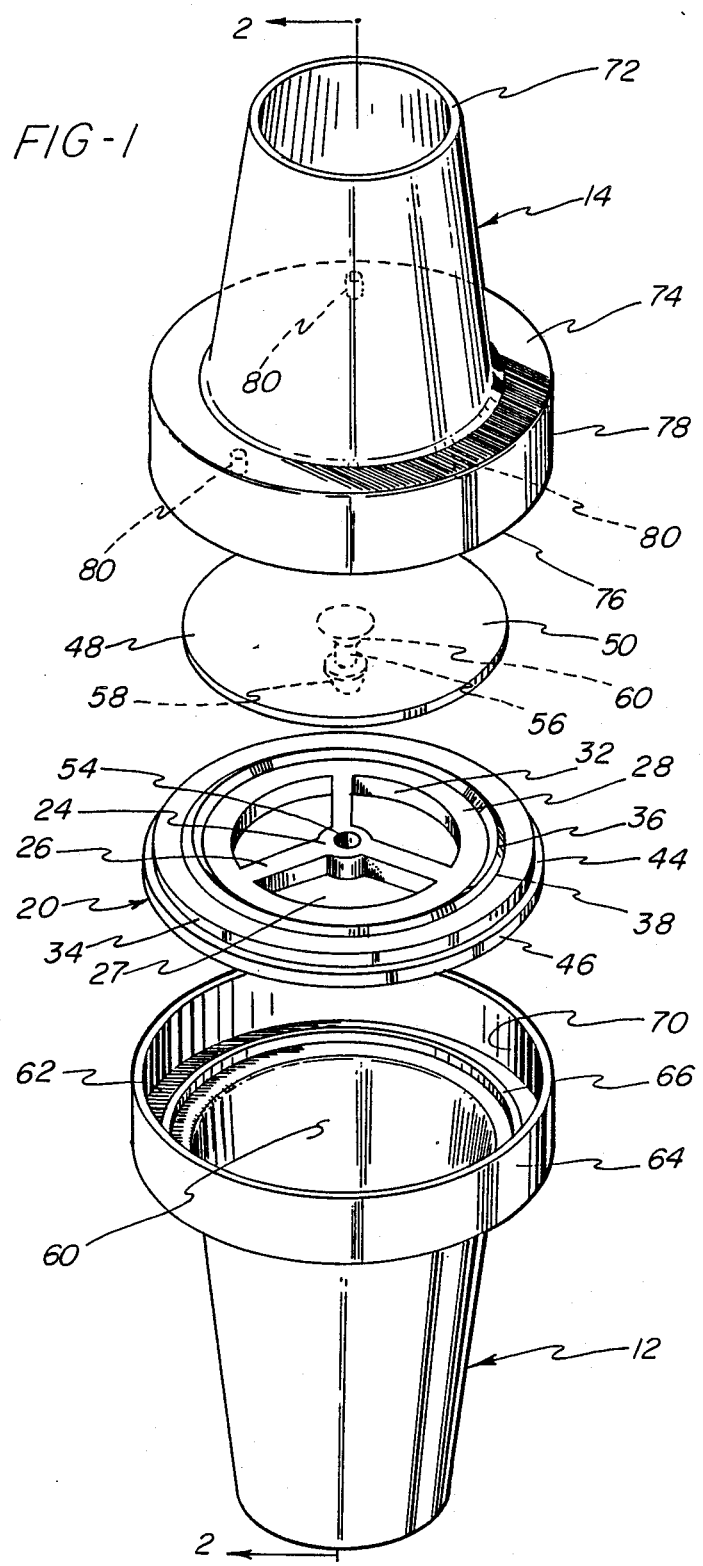
FIG. 1 is a perspective exploded view of a preferred embodiment of the one-way check valve of the present invention.

The valve assembly of the present invention, generally designated 10, includes a housing formed of an inlet portion 12 and an outlet portion 14. The inlet and outlet portions 12, 14 may be formed as tubular members and are joined together to house a substantially circular regulator assembly 16. The inlet portion 12, outlet portion 14 and regulator assembly 16 are formed as substantially symmetrical elements about the longitudinal axis 18.

Referring to FIG. 1, the regulator assembly 16 includes a flexible element 20 formed of an elastic material and is preferably formed of an elastomeric material such as rubber. The flexible element 20 has a substantially circular rim portion 22, a hub portion 24, and connecting members 26 extending radially from the hub portion 24 to the rim portion 22. The rim, hub and connecting members 22, 24, 26 define apertures 27 in the flexible element 20 for passage of fluids therethrough. The rim portion 22 is formed with a first substantially planar side 28 facing toward the outlet portion 14 and an opposing second substantially planar side 30 and radially spaced inner and outer surfaces 32 and 34, respectively.

The rim 22 further includes a bead portion 36 which extends axially from the first side 28. The bead portion 36 is a continuous substantially circular raised element and is positioned between the inner and outer surfaces 32, 34 and defines an outer diameter 38 where the bead 36 joins the rim 22 at a point on the bead 36 which is radially distal from the hub 24.

A substantially circular foot portion 40 extends axially from the second side 30 of the rim 22 and is located adjacent to the outer surface 34 thereof. The foot portion 40 includes an inner wall 42 which defines an inner diameter thereof where the foot portion 40 joins the rim portion 22. The inner diameter of the foot portion is substantially equal to the outer diameter 38 of the bead portion 36. The foot portion 40 further includes a flange portion 44 which extends radially beyond the outer surface 34 of the rim 22 to define an outer foot surface 46.

The regulator assembly 16 further includes a substantially circular relatively inflexible or rigid disk 48 which is preferably formed of a thin lightweight and inelastic material such as plastic. The disk 48 includes first and second substantially planar surfaces 50 and 52 and has a diameter slightly greater than the outer diameter 38 of the bead portion 36 such that the second surface 52 may engage the bead portion 36 in spaced relation to the first surface 28 of the rim 22 and thereby form a seal between the disk 48 and the flexible element 20.

The hub 24 of the flexible element 20 includes means defining a hole 54 therethrough for receiving a rod member 56 which projects from the second surface 52 of the disk 48 and which is located substantially centrally on the disk 48. The rod member 56 includes a generally conically shaped enlarged portion 58 which is formed with a diameter larger than that of the rod member 56 and the hole 54 such that the member 58 acts to hold the rod 56 in place within the hub 24. In addition, a substantially circular ramp portion 60 surrounds the rod 56 adjacent to the disk 48 and extends from the hole 54 in the hub 24 to the second surface 52 of the disk 48. The height of the ramp 60 in the axial direction is preferably equal to the height of the bead portion 36 and acts to space the hub 24 from contacting the second surface 52 of the disk 48.

The inlet portion 12 of the housing includes a side wall 60 and a flange 62 which extends radially outwardly from the wall 60. A first substantially circular lip 64 extends axially from a radially outer edge of the flange 62 and a second substantially circular lip 66 extends axially from the flange 62 at a location between the wall 60 and the first lip 64. The second lip 66 extends from the flange 62 a lesser distance than the first lip 64 and a radially outer surface 68 of the second lip 66 defines an outer diameter which is substantially equal to the inner diameter defined by the surface 42 of the foot portion 40. In addition, the first lip 64 includes an inner surface 70 which defines an inner diameter substantially equal to the diameter defined by the outer surface 46 of the foot 40 such that a groove is formed between the first and second lips 64, 66 for receiving the foot portion 40 of the flexible element 20 and wherein the second lip 66 acts as a support for the second surface 30 of the rim portion 22.

The outlet portion 14 of the housing includes a wall 72 and a flange 74 which extends radially outwardly from the wall 72. A substantially circular lip 76 extends axially from a radially outer edge of the flange 74 and includes an outer wall 78 which defines a diameter which is slightly smaller than the diameter defined by the wall 70 of the lip 64 such that the lip 76 of the outlet portion 14 may be received in telescoping relation within the first lip 64 of the inlet portion 12.

One or more stop members 80 in the form of rod shaped projections extend from the flange 74 of the outlet portion 14 at a location between the wall 72 and the lip 76 and are located on a diameter which is smaller than that of the disk 48. The stops 80 are equally spaced from one another and extend from the flange 74 a lesser distance than that of the lip 76. Alternatively, a single stop may be located centrally of the outlet portion 14 and supported by thin supporting members extending radially inwardly from the wall 72, such that the single stop is directed toward the disk 48.

The lip 76 of the outlet portion 14 engages the flange 44 of the foot portion 40 such that the foot portion 40 is held in position between the outlet portion lip 76 and the inlet portion flange 62, thereby forming a seal between the rim and the housing.

In operation, as may be best seen in FIGS. 2 and 3, the disk 48 and hub 24 form a lightweight unit supported for movement by the connecting members 26 wherein the disk 48 is normally in engagement with the bead portion 36 of the flexible element 20 to form a seal therebetween. In addition, when a greater fluid pressure is applied through the outlet portion 14 than through the inlet portion 12, the disk 48 is further forced into engagement with the bead 36 such that a strong seal preventing fluid flow is formed between the disk and bead portions.

When a greater fluid pressure is applied through the inlet portion 12 than through the outlet portion 14, the fluid forces the disk 48 to move toward the outlet portion 14 and out of engagement with the bead portion 36 along a line substantially parallel to the longitudinal axis 18 such that the fluid may flow through the apertures 27 between the connecting members 26 and around the outer edge of the disk 48 and then through the passage defined by the tubular wall 72.

As may be seen in FIG. 3, the flexible element 20 deflects primarily at the connecting members 26 when the disk 48 and the hub 24 to which it is connected are forced toward the outlet portion 14. As the disk 48 is moved toward the outlet portion 14, it approaches the stops 80 which act to space the disk 48 from the flange 74 to positively limit the movement of the disk 48 and thereby prevent damage to the flexible element 20 resulting from overstretching the connecting members 26, as well as ensure that fluid flow will continue around the edges of the disk 48 and the upper surface 50 thereof.

It should be apparent that by using a disk as the actuating member for the valve of the present invention, a large surface area is presented to pressure differentials occurring on opposite sides of the valve, such that the disk is capable of being actuated by very low forward flow pressures.

In addition, it should be apparent that as a result of the disk 48 seating on the bead 36 at the outer supported edge of the flexible element 20, such that check pressures are transmitted from the disk 48 to the supporting lip 66 along a line which is substantially parallel to the longitudinal axis 18, a positive seal is provided while enabling the regulator assembly to withstand extremely high check pressures without danger of the valve elements collapsing and thereby allowing reverse fluid flows through the valve.

Further, by constructing the disk 48 as a thin member formed of a lightweight material, the weight of the moving element of the valve is kept to a minimum, thereby ensuring that the valve may be actuated quickly upon changes in direction of the fluid flow and that the valve will function properly regardless of the orientation of the valve assembly.

In a practical application of the valve, such as within a positive crank case ventilation system for an internal combustion engine, the regulator assembly portion of the valve may be constructed having approximately an inch diameter and the stops may be positioned such that the disk undergoes a movement of approximately 40 thousandths of an inch to open the valve. The pressure at which the valve will open may be controlled by altering the height of the bead portion 36 or alternatively, changing the length of the rod member 56 to vary the amount of preload present for biasing the disk 48 into contact with the bead portion 36.

Figure 4:
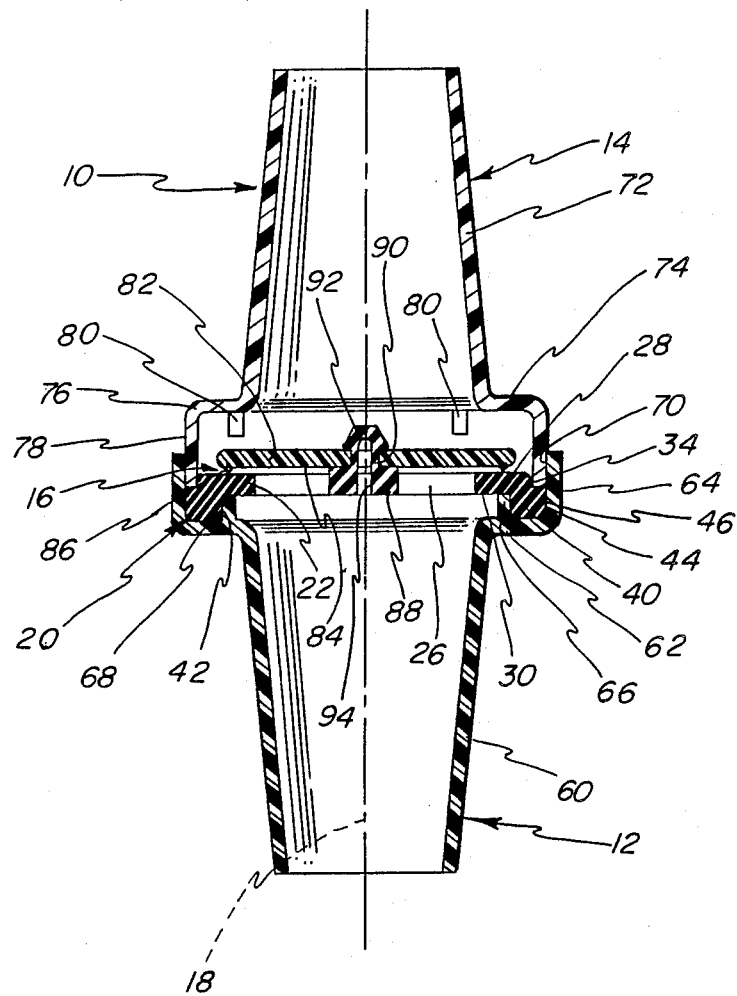
FIG. 4 is an elevational view similar to FIG. 2 showing an alternative embodiment of the present invention.

It should be noted that other embodiments of this valve may be formed which function in the same manner as the above-described valve structure. FIG. 4 shows an alternative embodiment in which the elements which are unchanged from the previous embodiment are identified with the same reference numerals as that embodiment.

In the embodiment shown in FIG. 4, a disk 82 similar to the disk 48 of the previous embodiment is provided and includes a lower surface 84 having a substantially circular raised bead 86 extending therefrom toward the surface 28 of the rim 22 which is now formed without a bead. The bead 86 of the present embodiment is formed with substantially the same diameter as the bead 36 of the previous embodiment.

In addition, the flexible element 20 is provided with a hub 88 which extends beyond the plane of the surface 28 a distance approximately equal to the axial height of the bead 86 on the disk 82. An elongated extension 90 extends axially from the hub 88 and terminates in a generally conically-shaped enlarged end 92. The extension 90 extends through a hoe in the disk 82 and the enlarged end 92 and hub 88 cooperate with opposing surfaces of the disk 82 to hold the disk 82 in place on the flexible element 20.

The hub 88 and extension include a hole 94 extending therethrough in a longitudinal direction. The hole 94 further lightens the movable portion of the valve as well as facilitates compression of the extension 90 and enlarged end 92 for insertion into the disk 82.

Further, other methods of attaching the disk and the flexible element together have been contemplated. For example, these elements may be held together by means of a pop-rivet or other fastener means. Although such attachment means may add to the weight of the movable member, they may be satisfactory for certain applications of the valve.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A check valve allowing fluid flow in a first direction and preventing fluid flow in a second direction comprising:
   a housing having an inlet and an outlet;
   a regulator assembly having a first flexible regulator portion and a second relatively inflexible regulator portion;
   said first regulator portion extending diametrically across said housing and having means defining apertures for allowing fluid flow in said first direction therethrough;
   said second regulator portion attached to said first regulator portion and including a sealing surface for contacting said first regulator portion for preventing fluid flow in said second direction;
   means for attaching said regulator assembly to said housing; and
   said fist regulator portion being adapted to flex whereby said second regulator portion is caused to move relative to said housing to allow said sealing surface of said second regulator portion to separate from said first regulator portion during fluid flow in said first direction.

2. The check valve of claim 1 wherein said second regulator portion is disk-shaped and said sealing surface is a substantially planar surface which extends diametrically across said housing and said first regulator portion.

3. The check valve of claim 2 wherein said housing includes a stop member for contacting a surface on said second regulator portion during fluid flow in said first direction.

4. The check valve of claim 1 or 2 wherein said first regulator portion includes a raised bead portion for contacting said sealing surface of said second regulator portion.

5. The check valve of claim 4 wherein said bead portion is substantially circular.

6. The check valve of claim 1 wherein said sealing surface comprises a raised bead for contacting said first regulator portion.

7. The check valve of claim 6 wherein said bead is substantially circular.

8. The check valve of claim 1 wherein said second regulator portion is attached to a first centrally located portion of said first regulator portion.

9. The check valve of claim 8 wherein said sealing surface of said second regulator portion contacts said first regulator portion at a second location radially distal from said first centrally located portion.

10. The check valve of claim 9 wherein said means defining apertures in said first regulator portion are located between said first and second locations on said first regulator portion.

11. The check valve of claim 10 wherein said means defining apertures in said first regulator portion include thin flexible members extending between said first and second locations on said first regulator portion.

12. The check valve of claim 1 wherein said means for attaching said regulator assembly to said housing comprises means on said housing for rigidly holding said first regulator portion.

13. The check valve of claim 1 wherein said first regulator portion is formed of an elastic material and said second regulator portion is formed of a light relatively inflexible material.

14. The check valve of claims 1 or 13 wherein said housing defines a longitudinal axis and said second regulator portion is movable parallel to said longitudinal axis to control said fluid flow.

15. A check valve allowing fluid flow in a first direction and preventing fluid flow in a second direction comprising:
   a housing having an inlet and an outlet;
   a regulator assembly comprising a flexible elastic element and a disk portion;
   said flexible elastic element including a central hub portion, a radially outer rim portion and connecting members extending from said hub portion to said rim portion and defining apertures for allowing fluid flow through said elastic element in said first direction;
   said disk portion attached to said hub portion and extending radially outwardly such that a sealing surface on said disk may contact said rim portion and thereby form a seal for preventing fluid flow through said elastic element in said second direction;
   means for attaching said regulator assembly to said housing; and
   said connecting members of said elastic element being adapted to flex to allow said sealing surface of said disk portion to separate from said rim portion during fluid flow in said first direction.

16. The check valve of claim 15 wherein said disk portion is formed of a relatively inflexible lightweight material.

17. The check valve of claim 16 wherein said disk portion is formed of plastic.

18. The check valve of claim 15 wherein said sealing surface of said disk portion is substantially planar.

19. The check valve of claim 18 wherein said rim portion includes a raised bead for engaging said sealing surface of said disk portion to form a seal for preventing fluid flow in said second direction.

20. The check valve of claim 15 wherein said sealing surface comprises a raised bead for contacting said elastic element.

21. The check valve of claim 19 wherein said sealing surface of said disk portion is separated from contact with said hub portion of said elastomer element in an axial direction.

22. The check valve of claim 15 wherein said housing includes at least one stop member for contacting a surface on said disk portion during fluid flow in said first direction.

23. The check valve of claim 15 wherein said elastic element is formed of rubber.

24. The check valve of claim 15 wherein said housing defines a longitudinal axis and said disk portion is movable parallel to said longitudinal axis to control said fluid flow.

25. The check valve of claim 15 wherein said means for attaching said regulator assembly to said housing comprises means on said housing for rigidly holding said elastic element.

26. A check valve allowing fluid flow in a first direction and preventing fluid flow in a second direction comprising:
   a flexible elastic element having a substantially circular rim portion, a hub portion, and connecting members extending radially from said hub portion to said rim portion;
   said rim portion having first and second substantially planar surfaces on axially opposed sides of said elastic element and radially spaced inner and outer surfaces;
   a substantially circular raised bead portion extending axially from said first surface of said rim portion at a location spaced from said inner and outer surfaces, said bead portion defining an outer diameter thereof where said bead portion joins said rim portion;
   a substantially circular foot portion extending axially from said second surface of said rim portion at a location adjacent to said outer surface of said rim portion, said foot portion defining an inner diameter thereof where said foot portion joins said rim portion, said inner diameter of said foot portion being substantially equal to said outer diameter of said bead portion;
   said foot portion including a flange portion extending radially beyond said outer surface of said rim to define an outer foot surface;
   a relatively inflexible lightweight disk having first and second substantially planar surfaces and having a diameter slightly greater than said outer diameter of said bead portion such that said second surface may engage said bead portion in spaced relation to said first surface of said rim to form a seal;
   said hub including means defining a hole therethrough and said disk having a substantially centrally located rod member projecting from said second surface thereof and extending through said hole in said hub to attach said disk to said hub;
   an enlarged portion on an end of said rod member opposite from said disk, said enlarged portion having a diameter greater than that of said rod member for maintaining said rod member in said hole;
   a substantially circular ramp portion surrounding said rod member adjacent to said disk, said ramp portion extending from said hole in said hub to said second surface of said disk and acting to space said hub from said disk;
   a housing including an inlet portion and an outlet portion;
   said inlet portion of said housing having a wall and a flange extending radially outwardly from said wall;
   a first substantially circular lip extending axially from a radially outer edge of said inlet portion flange;
   a second substantially circular lip extending axially from said flange at a location between said wall and said first lip of said inlet portion, said second lip extending from said flange a lesser distance than said first lip and defining an outer diameter substantially equal to said inner diameter of said foot portion and said first lip defining an inner diameter substantially equal to the diameter of said outer foot surface, said foot portion being positioned between said first and second lips and said second surface of said rim portion engaging said second lip;
   said outlet portion of said housing having a wall and a flange extending radially outwardly from said wall of said outlet portion;
   a substantially circular lip extending axially from a radially outer edge of said outlet portion flange and having a lesser diameter than that of said first lip of said inlet portion;

one or more stop members extending from said flange of said outlet portion at a location between said tubular wall and said flange of said outlet portion and located on a diameter which is smaller than that of said disk, said stops extending from said flange of said outlet portion a lesser distance than said lip;

said lip of said outlet portion being positioned within said first lip of said inlet portion and said lip of said outlet portion engaging said flange of said foot portion such that said foot portion is held in position between said outlet portion lip and said inlet portion flange and a fluid tight seal is formed between said foot portion and said inlet portion flange;

said disk being forced into engagement with said bead portion on said elastic element when a fluid pressure is applied to said disk through said outlet portion of said housing which is greater than a fluid pressure applied to said disk through said inlet portion of said housing, such that a seal preventing fluid flow is formed between said disk and said bead portion; and said disk being moved toward said stops on said outlet portion and out of engagement with said bead portion when a fluid pressure is a applied to said disk through said inlet portion of said housing which is greater than a fluid pressure applied to said disk through said outlet portion of said housing, such that fluid is permitted to flow from said inlet to said outlet side of said housing, and wherein said stops may limit the movement of said disk.

* * * * *